United States Patent [19]

Takahashi

[11] 4,362,355
[45] Dec. 7, 1982

[54] OPERATING MICROSCOPE ASSEMBLY

[75] Inventor: Naoyuki Takahashi, Hachioji, Japan

[73] Assignee: Olympus Optical Co., Ltd., Japan

[21] Appl. No.: 229,462

[22] Filed: Jan. 29, 1981

[30] Foreign Application Priority Data

Apr. 28, 1980 [JP] Japan .............................. 55-58679[U]

[51] Int. Cl.³ .............................................. G02B 21/24
[52] U.S. Cl. ......................................... 350/84; 350/85
[58] Field of Search ............................. 350/82, 84, 85

[56] References Cited

U.S. PATENT DOCUMENTS

| | | | |
|---|---|---|---|
| 2,967,458 | 1/1961 | Stone, Jr. ........................ | 350/84 X |
| 3,352,521 | 11/1967 | Tyler ................................ | 350/85 X |
| 3,809,454 | 5/1974 | Brambring ........................ | 350/85 X |
| 3,887,267 | 6/1975 | Heller . | |
| 4,167,302 | 9/1979 | Karasawa ........................ | 350/85 X |

Primary Examiner—John K. Corbin
Assistant Examiner—Matthew W. Koren
Attorney, Agent, or Firm—Ostrolenk, Faber, Gerb & Soffen

[57] ABSTRACT

A movable microscope assembly includes a translational movement mechanism located between a microscope and tilting means associated with the microscope, for causing a translational movement of the microscope in a plane perpendicular to the observation optical axis of the microscope and in the directions of Y- and X-axes in such plane.

7 Claims, 4 Drawing Figures

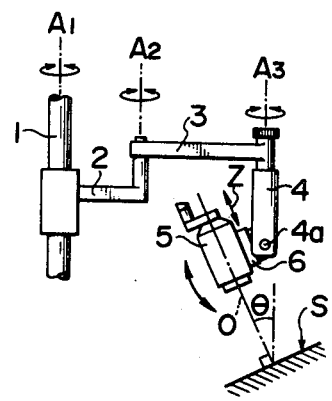
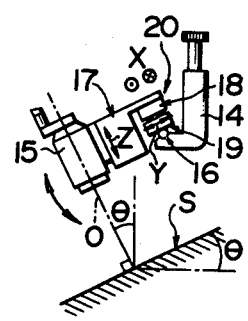
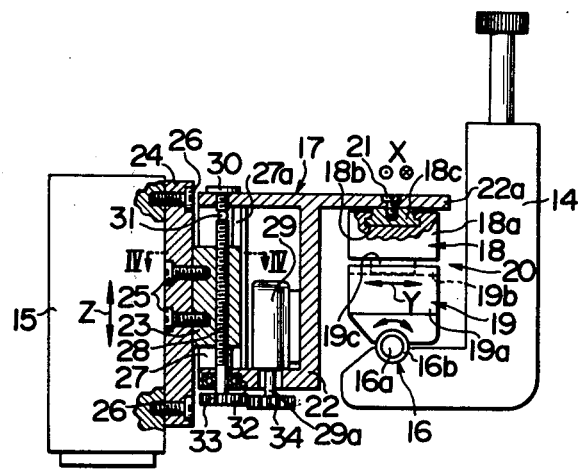
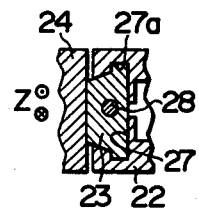

OPERATING MICROSCOPE ASSEMBLY

BACKGROUND OF THE INVENTION

The invention relates to an operating microscope assembly, and more particularly, to a movable microscope assembly which is used for the purpose of medical operations.

A conventional operating microscope is illustrated in FIG. 1. As shown, a stand or stanchion 1 is fixedly mounted on a base (not shown), and a first arm 2 is mounted on the stand 1 so as to be vertically movable therealong and also angularly movable in a horizontal plane. A second arm 3 has one end pivotally connected with the end of the first arm 2 remote from stand 1 so as to be angularly movable in a horizontal plane. At its other end, the second arm 3 has a downwardly depending portion on which a suspension member 4 is rotatably mounted. The lower end of the suspension member 4 fixedly carries a horizontal mounting pin 4a, on which a pedestal 6 is mounted so as to be tiltable about the axis of the pin 4a. An operating microscope 5 is slidably mounted on the pedestal 6 and is movable in the direction of the optical axis O of an observation optical system, that is, in the direction of Z-axis, for focussing purposes.

With the conventional arrangement described above, an object on a plane S may be observed by disposing the microscope 5 so that its observation optical axis O is at an angle of $\theta$ with respect to the vertical. When it is desired to observe another location on the plane S, it will be noted that the freedom of motion of the microscope 5 is that of angular movement about vertical axes $A_1$, $A_2$, $A_3$ and tilting motion about the mounting pin 4a. Hence, it is necessary to bring the microscope 5 over the location to be observed by either angularly moving the first arm 1 about the vertical axis $A_1$ of the stand 1, angularly moving the second arm 3 about the vertical axis $A_2$ or angularly moving the suspension member 4 about the vertical axis $A_3$ which extends through the other end of the second arm 3, followed by a movement of the microscope 5 in the Z-axis direction for focussing purpose. Thus it will be seen that the required operation is very troublesome, and requires skill and a considerable length of time.

SUMMARY OF THE INVENTION

It is an object of the invention to eliminate the disadvantage of the conventional arrangement by providing an operating microscope assembly including a translational movement mechanism located between the microscope and means for tilting it and on which the microscope is mounted.

In accordance with the invention, when the operating microscope is to be relocated, it may be moved in both X-axis and Y-axis directions by operating the translational movement mechanism without substantially requiring a re-focussing operation, thus allowing a desired location to be observed immediately. The translational movement mechanism can be simply operated by anyone without requiring special skill, and thus the relocation can be completed in a reduced length of time.

According to another aspect of the invention, the operating microscope assembly includes a focussing mechanism including a reversible motor and is located between the microscope itself and the translational movement mechanism. The focus adjustment is simply achieved by driving the motor. In this manner, operating convenience is enhanced in accordance with the invention.

BRIEF DESCRIPTION OF THE DRAWINGS

FIG. 1 is a schematic side elevation of one form of a conventional operating microscope assembly;

FIG. 2 is a schematic side elevation of an operating microscope assembly according to one embodiment of the invention;

FIG. 3 is an enlarged side elevation, partly in section, of the microscope assembly shown in FIG. 2; and FIG. 4 is a fragmentary cross section taken along the line IV—IV shown in FIG. 3.

DESCRIPTION OF THE PREFERRED EMBODIMENT

Referring to FIGS. 2 and 3, there is shown an operating microscope assembly according to the invention including a microscope 15 which is used for the purpose of observation. A support for the microscope, comprising a base and suspension member 14 corresponding to the suspension member 4 shown in FIG. 1, is provided with means 16 which causes an observation microscope 15 to tilt. A microscope translational movement mechanism 20 is interposed between the microscope 15 and the tilting means 16, and includes an X-axis translating mechanism 18 and a Y-axes translating mechanism 19 which cause the microscope 15 to move in the directions of X- and Y-axis in a plane which is perpendicular to the optical axis of the microscope. In addition, a focussing mechanism 17 is disposed between the microscope 15 and the translational movement mechanism 20 for focussing purposes.

The suspension member 14 is mounted on the base of the microscope assembly so as to be rotatable in a horizontal plane, in a similar manner to the suspension member 4 shown in FIG. 1. It includes an L-shaped bottom, the horizontal limb of which carries the tilting means 16 on its upper side adjacent to its free end. The tilting means 16 is conventional in construction, and includes a stationary shaft 16a, with which a movable member 16b is in frictional engagement for rotation thereabout. The Y-axis translating mechanism 19 includes a dovetail groove member 19a which is fixedly connected with the movable member 16b. The dovetail groove member 19a is in the form of a pedestal, in the top surface of which is formed a dovetail groove 19b extending in the direction of the Y-axis. The X-axis translating mechanism 18, which is also in the form of a pedestal, includes a dovetail groove member 18a integrally carrying on its bottom surface a dovetail member 19c, which slidably fits in the dovetail groove 19b. Formed in the upper surface of the dovetail groove member 18a is a dovetail groove 18b extending in the direction of the X-axis and which is slidably engaged by a dovetail member 18c, which causes the microscope 15 to move in the direction of the X-axis.

The focussing mechanism 17, which is interposed between the translational mechanism 20 and the microscope 15, is housed within a casing 22 which couples the X-axis translating mechanism 18 and the microscope 15 together. As shown in FIG. 3, the casing 22 has an extension 22a which is integral with the upper wall thereof and which is secured to the dovetail member 18c by means of a set screw 21. A dovetail member 23 is disposed within the casing 22 for movement in the direction of the optical axis of the microscope 15, and a support plate 24 which supports the microscope 15 is secured to the dovetail member 23 by means of set screws 25. It is to be noted that the support plate 24 is secured to the side wall of the microscope 15 by set screws 26. The focussing mechanism 17 comprises, in addition to the dovetail member 23, a guiding dovetail groove member 27 (see FIG. 4) extending vertically along the opposite wall of the casing 22 and in parallel relationship with the support plate 24, a lead screw 28 vertically extending through and threadably engaging the central portion of the dovetail member 23, and a reversible motor 29 which is adapted to drive the lead screw 28 for rotation. The dovetail groove member 27 is slidably engaged by the dovetail member 23.

A clamping screw 30 is screwed into the top wall of the casing 22, and a ball bearing 31 is interposed between the lower end face of the screw 30 and the upper end face of the lead screw 28. The lower end of the lead screw 28 extends through the lower wall of the casing 22 and is rotatably carried by a ball bearing 32 disposed therein. The free end of the lead screw 28 which extends below the lower wall of the casing 22 fixedly carries a drive gear 33, which meshes with an output gear fixedly mounted on the free end of an output shaft 29a of the reversible motor 29, located deep inside the casing 22, which shaft 29a projects below the lower wall of the casing 22.

When observing an object located on the plane S which is at an angle of θ with respect to the vertical, using the movable microscope assembly according to the invention, the dovetail groove member 19a of the Y-axis translating mechanism 19 may be tilted about the shaft 16a to dispose the microscope 15 at an angle of θ with respect to the vertical so that the observation optical axis O is perpendicular to the plane S. The focussing mechanism 17 is then operated to move the microscope 15 in the direction of the Z-axis for focussing purposes. To this end, an input signal is applied to the reversible motor 19 to drive it, whereupon the lead screw 28 is rotated through the meshing engagement between the output gear 34 and the drive gear 33, thus moving the dovetail member 23 and hence the microscope 15 along the Z-axis, for example, upward, as viewed in FIG. 3, along the dovetail groove 27a formed in the dovetail groove member 27. By inverting the polarity of the input signal applied to the reversible motor 29, the lead screw 28 may be rotated in the opposite direction to move the dovetail member 23 and hence the microscope 15 downward, as viewed in FIG. 3, in the direction of the Z-axis. In this manner, the focusing operation is simply achieved.

When a new point on the plane S is to be observed, both the X-axis and the Y-axis translating mechanism 18, 19 may be operated to move the microscope 15 in the directions of the X- and the Y-axis so that the microscope 15 may be located opposite to the new point to be observed. Specifically, the dovetail member 19c may be moved along the dovetail groove 19b to cause an integral movement of the mechanism 18, the casing 22 and the microscope 15 in the direction of the Y-axis. On the other hand, the dovetail member 18c may be moved along the dovetail groove 18b to cause an integral movement of the casing 22 and the microscope 15 in the direction of the X-axis. In this manner, the location on the plane S which is to be observed can be very simply changed. Since the microscope 15 undergoes a translational movement with respect to the plane S during such movement, there is no substantial need for repeating the focussing operation.

Thus it will be seen that the movable microscope assembly of the invention permits the location to be observed to be freely changed in a plane which is perpendicular to the observation optical axis without substantially requiring a repeated focussing operation, thus eliminating a troublesome operation required in the prior art.

It should be understood that while the invention has been described above in connection with a microscope assembly which is used in connection with a medical operation, it may be equally applied to a biological or metal microscope, stereomicroscope and other observation microscopes.

What is claimed is:
1. A movable microscope assembly, comprising:
a microscope having an optical axis;
support means for supporting said microscope;
tilting means for tilting said optical axis of said microscope;
a translational movement mechanism for translationally moving said microscope in any desired direction in a plane perpendicular to said optical axis of said microscope; and
a focussing mechanism for moving said microscope along said optical axis.
2. A movable microscope assembly as claimed in claim 1, in which said translational movement mechanism is connected to said support means by said tilting means.
3. A movable microscope assembly as claimed in claim 1, in which said support means comprises a base and a suspension member mounted thereon.
4. A movable microscope assembly according to claim 1, in which said translational movement mechanism comprises an X-axis translating mechanism and a Y-axis translating mechanism which respectively are for moving a microscope supported by said movable microscope assembly in first and second perpendicular directions in a plane perpendicular to the optical axis of such microscope.
5. A movable microscope assembly according to claim 4 in which said Y-axis translating mechanism comprises a first dovetail groove member secured to said tilting means and having a first dovetail groove formed therein which extends along said second direction, and a first dovetail member slidably received in said first dovetail groove for moving a microscope supported by said movable microscope assembly along said second direction, and in which said X-axis translating mechanism comprises a second dovetail groove member secured to said first dovetail member and having a second dovetail groove formed therein which extends in said first direction and a second dovetail member slidably received in said second dovetail groove for moving a microscope supported by said movable microscope assembly along said first direction.
6. A movable microscope assembly according to claim 1, wherein said focussing mechanism comprises a dovetail member for carrying said microscope with the observation optical axis thereof in a predetermined orientation relative to said dovetail member and for allowing movement of said microscope along the observation optical axis thereof, a guiding dovetail groove member in which said dovetail member is slidably received, a lead screw extending through and threadably engaging said dovetail member, and a reversible motor for driv- ing said lead screw for rotation, said focussing mechanism being disposed between said microscope and said translational movement mechanism.

7. A movable microscope assembly, comprising:
   support means for supporting a microscope;
   tilting means for tilting the optical axis of a microscope supported by said movable microscope assembly;
   a translational movement mechanism for translationally moving a microscope supported by said movable microscope assembly in any desired direction in a plane perpendicular to the optical axis of such microscope; and
   a focussing mechanism which comprises a dovetail member for carrying a microscope with the observation optical axis thereof in a predetermined orientation relative to said dovetail member and for allowing movement of such microscope along the observation optical axis thereof, a guiding dovetail groove member in which said dovetail member is slidably received, a lead screw extending through and threadably engaging said dovetail member, and a reversible motor for driving said lead screw for rotation, the focussing mechanism being disposed between such microscope and said transational movement mechanism.

* * * * *